(12) United States Patent
Fukusen

(10) Patent No.: US 11,701,775 B2
(45) Date of Patent: Jul. 18, 2023

(54) METHOD OF SETTING TARGET FORCE UPPER LIMIT AND ROBOT SYSTEM

(71) Applicant: Seiko Epson Corporation, Toyko (JP)

(72) Inventor: Takahisa Fukusen, Matsumoto (JP)

(73) Assignee: SEIKO EPSON CORPORATION

( * ) Notice: Subject to any disclaimer, the term of this patent is extended or adjusted under 35 U.S.C. 154(b) by 110 days.

(21) Appl. No.: 17/343,938

(22) Filed: Jun. 10, 2021

(65) Prior Publication Data

US 2021/0387336 A1   Dec. 16, 2021

(30) Foreign Application Priority Data

Jun. 11, 2020  (JP) ................................. 2020-101421

(51) Int. Cl.
  *B25J 9/16*   (2006.01)
  *B25J 13/08*  (2006.01)

(52) U.S. Cl.
  CPC .......... *B25J 9/1633* (2013.01); *B25J 9/1612* (2013.01); *B25J 13/082* (2013.01)

(58) Field of Classification Search
  CPC combination set(s) only.
  See application file for complete search history.

(56) References Cited

U.S. PATENT DOCUMENTS

| 6,317,653 B1 * | 11/2001 | Kamiya | ................ B25J 9/1633 414/730 |
| 2021/0031377 A1 * | 2/2021 | Narita | .................... B25J 13/083 |

FOREIGN PATENT DOCUMENTS

| JP | 2004-160614 A | 6/2004 |
| JP | 2008-049459 A | 3/2008 |
| JP | 2011-088260 A | 5/2011 |

* cited by examiner

*Primary Examiner* — Jeff A Burke
*Assistant Examiner* — Joshua Alexander Garza
(74) *Attorney, Agent, or Firm* — Harness, Dickey & Pierce, P.L.C.

(57) ABSTRACT

A method of setting a target force upper limit for a robot gripping an object with a gripping unit and operating by force control to bring an acting force close to a target force, includes gripping the object with the gripping unit, performing a pressing operation to press the object gripped by the gripping unit against a contact surface by the force control, performing a pressing force acquisition operation to acquire the force acting on the gripping unit during the pressing operation as a pressing force, repeating a setting change operation to increase the target force, the pressing operation, and the pressing force acquisition operation until a state in which the pressing force is not equal to or larger than the target force appears, and setting a target force upper limit based on the pressing force acquired in the pressing force acquisition operation at a time when the state appears.

4 Claims, 8 Drawing Sheets

| ELAPSED TIME | 0 TO 5 SEC | 5 TO 10 SEC | 10 TO 15 SEC | 15 TO 20 SEC |
|---|---|---|---|---|
| TARGET FORCE | 5N | 10N | 15N | 20N |
| PRESSING FORCE | 5N | 10N | 15N | 20 N > |
| SCHEMATIC DIAGRAM |  |  |  |  |
| SLIDING | NOT OCCURS | NOT OCCURS | NOT OCCURS | OCCURS |

| ELAPSED TIME | 0 TO 5 SEC | 5 TO 10 SEC | 10 TO 15 SEC | 15 TO 20 SEC |
|---|---|---|---|---|
| TARGET FORCE | 5N | 10N | 15N | 20N |
| PRESSING FORCE | 5N | 10N | 15N | 20 N > |
| OUTPUT VALUE OF FORCE SENSOR |  |  |  |  |
| SLIDING | NOT OCCURS | NOT OCCURS | NOT OCCURS | OCCURS |

FIG. 7

| ELAPSED TIME | 0 TO 5 SEC | 5 TO 10 SEC | 10 TO 15 SEC |
|---|---|---|---|
| TARGET FORCE | 15N | 16N | 17N |
| PRESSING FORCE | 15N | 16N | 17 N > |
| SCHEMATIC DIAGRAM | | | |
| SLIDING | NOT OCCURS | NOT OCCURS | OCCURS |

FIG. 8

| ELAPSED TIME | 0 TO 5 SEC | 5 TO 10 SEC | 10 TO 15 SEC | 15 TO 20 SEC |
|---|---|---|---|---|
| TARGET FORCE | 16.0N | 16.1N | 16.2N | 16.3N |
| PRESSING FORCE | 16.0N | 16.1N | 16.2N | 16.3 N > |
| SCHEMATIC DIAGRAM | | | | |
| SLIDING | NOT OCCURS | NOT OCCURS | NOT OCCURS | OCCURS |

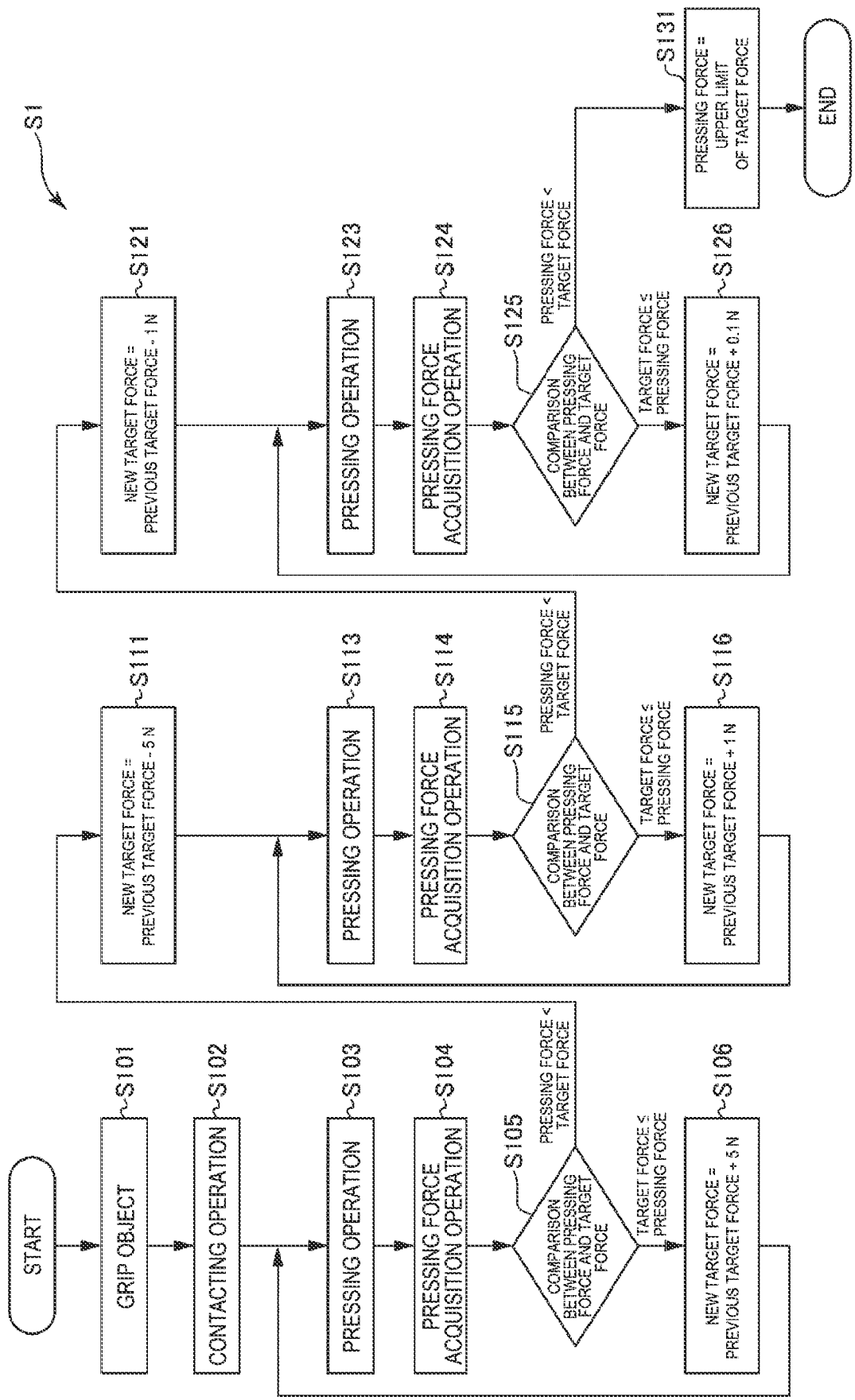

METHOD OF SETTING TARGET FORCE UPPER LIMIT AND ROBOT SYSTEM

The present application is based on, and claims priority from JP Application Serial Number 2020-101421, filed Jun. 11, 2020, the disclosure of which is hereby incorporated by reference herein in its entirety.

BACKGROUND

1. Technical Field

The present disclosure relates to a method of setting a target force upper limit and a robot system.

2. Related Art

JP-A-2008-49459 discloses a method of controlling a manipulator, when the manipulator grips an object to be gripped having an unknown weight, of calculating the weight of the object from a material and a three-dimensional shape of the object and calculating a gripping force based thereon. According to the method, the gripping force may be adjusted from specific information including the material, the three-dimensional shape, a volume, density, the weight of the object to be gripped, and dropping of the object from the manipulator may be prevented. Thereby, the manipulator may reliably grip even the object having an unknown weight without dropping.

A component analyzer is used for measurement of the material of the object to be gripped and a shape measurement sensor is used for measurement of the three-dimensional shape of the object. These measurement devices are expensive and higher cost of a manipulator control system is unavoidable for prior specification of the gripping force to prevent sliding of the object. As described above, it is not easy to specify an upper limit of the gripping force to prevent sliding of the object.

SUMMARY

A method of setting a target force upper limit according to an application example of the present disclosure is a method of setting a target force upper limit for a robot that grips an object with a gripping unit and operates by force control to bring a force acting on the gripping unit close to a target force, including gripping the object with the gripping unit, performing a pressing operation to press the object gripped by the gripping unit against a contact surface by the force control, performing a pressing force acquisition operation to acquire the force acting on the gripping unit during the pressing operation as a pressing force, repeating a setting change operation to increase the target force, the pressing operation, and the pressing force acquisition operation until a state in which the pressing force is not equal to or larger than the target force appears, and setting an upper limit of the target force in the force control based on the pressing force acquired in the pressing force acquisition operation at a time when the state appears.

A robot system according to an application example of the present disclosure includes a robot arm, a gripping unit provided in the robot arm and gripping an object, a force sensor detecting a force acting on the gripping unit, and a control unit controlling driving of the robot arm by force control to bring the force detected by the force sensor close to a target force, wherein the control unit has a target force setting part that determines the target force, a pressing force acquisition part that acquires the force detected by the force sensor when the object is pressed against a contact surface as a pressing force, a comparison part that compares the target force and the pressing force and outputs a comparison result, a driving instruction part that outputs a signal for driving the robot arm, a determination part that determines whether or not to sequentially repeat a setting change operation to increase the target force, a pressing operation to press the object against the contact surface by the force control, and a pressing force acquisition operation to acquire the pressing force based on the comparison result until a state in which the pressing force is not equal to or larger than the target force appears, and an upper limit setting part that sets an upper limit of the target force in the force control based on the pressing force when the state appears, and the control unit controls driving of the robot arm by the force control in consideration of the upper limit.

BRIEF DESCRIPTION OF THE DRAWINGS

FIG. 7 is a table for explanation of changes of the pressing force when the target force is increased by 1 N within predetermined times.

FIG. 8 is a table for explanation of changes of the pressing force when the target force is increased by 0.1 N within predetermined times.

FIG. 10 is a flowchart according to the method of setting the target force upper limit of a modified example formed by omission of second and subsequent contacting operations from the flowchart shown in FIG. 4.

DESCRIPTION OF EXEMPLARY EMBODIMENTS

As below, preferred embodiments of a method of setting a target force upper limit and a robot system according to the present disclosure will be explained in detail with reference to the accompanying drawings.

1. First Embodiment

First, a robot system according to a first embodiment will be explained.

Figure 1:
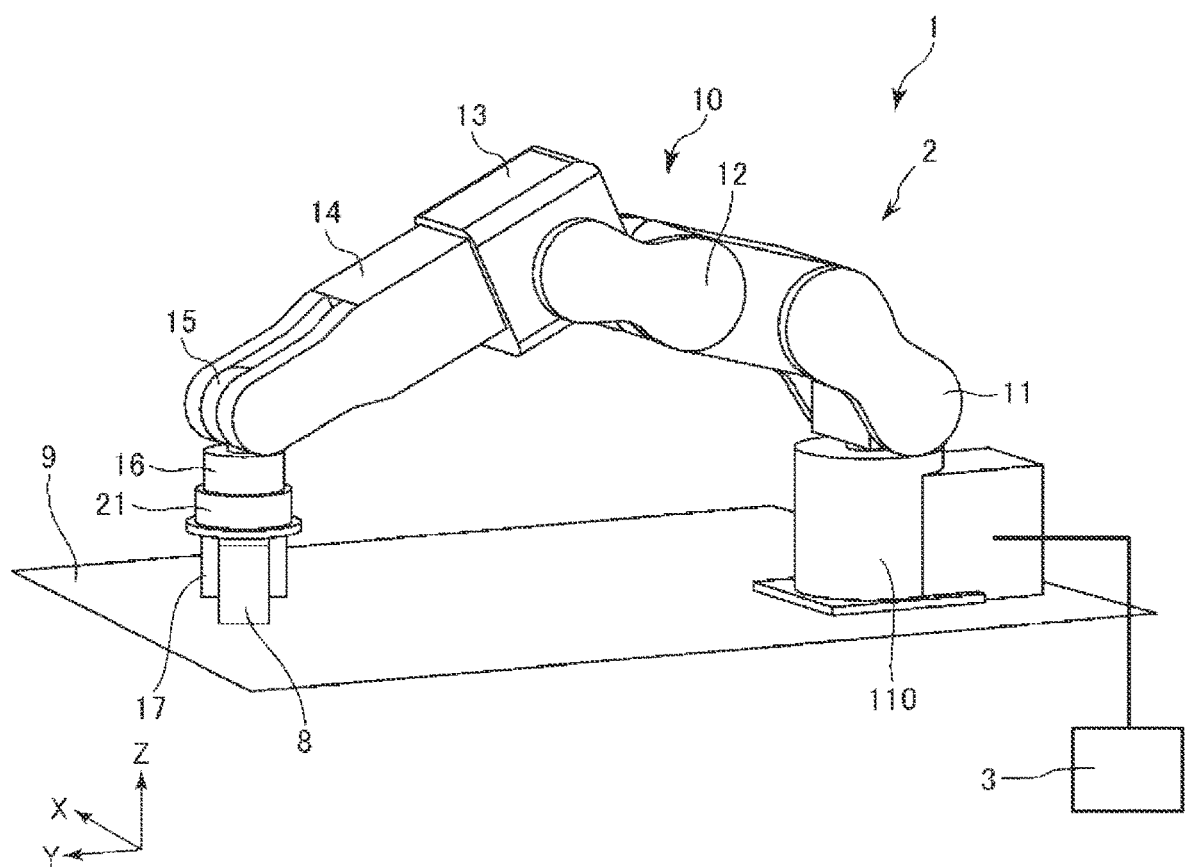
FIG. 1 is a perspective view showing a robot system according to a first embodiment.
Figure 2:
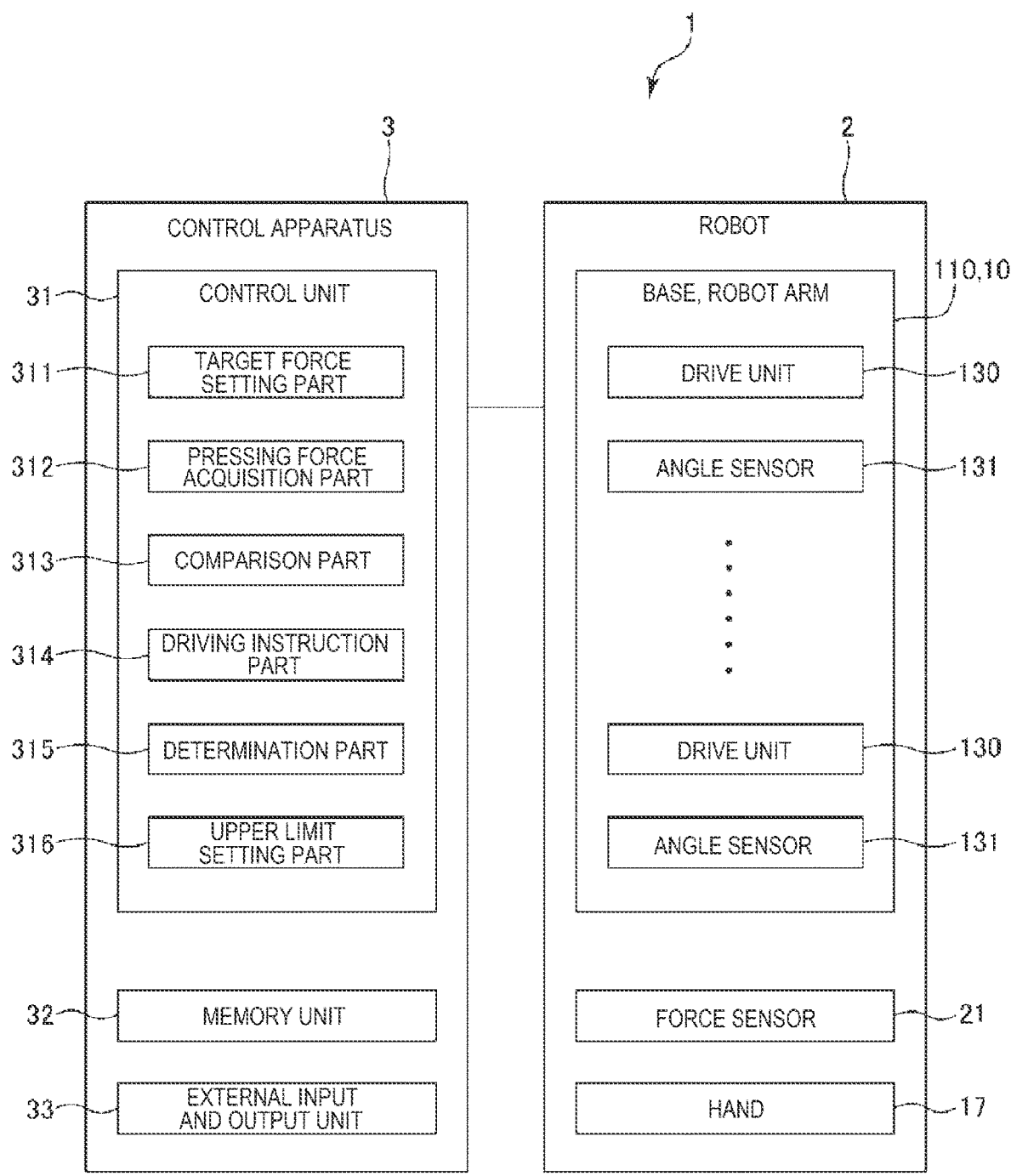
FIG. 2 is a functional block diagram of the robot system shown in FIG. 1.
Figure 3:
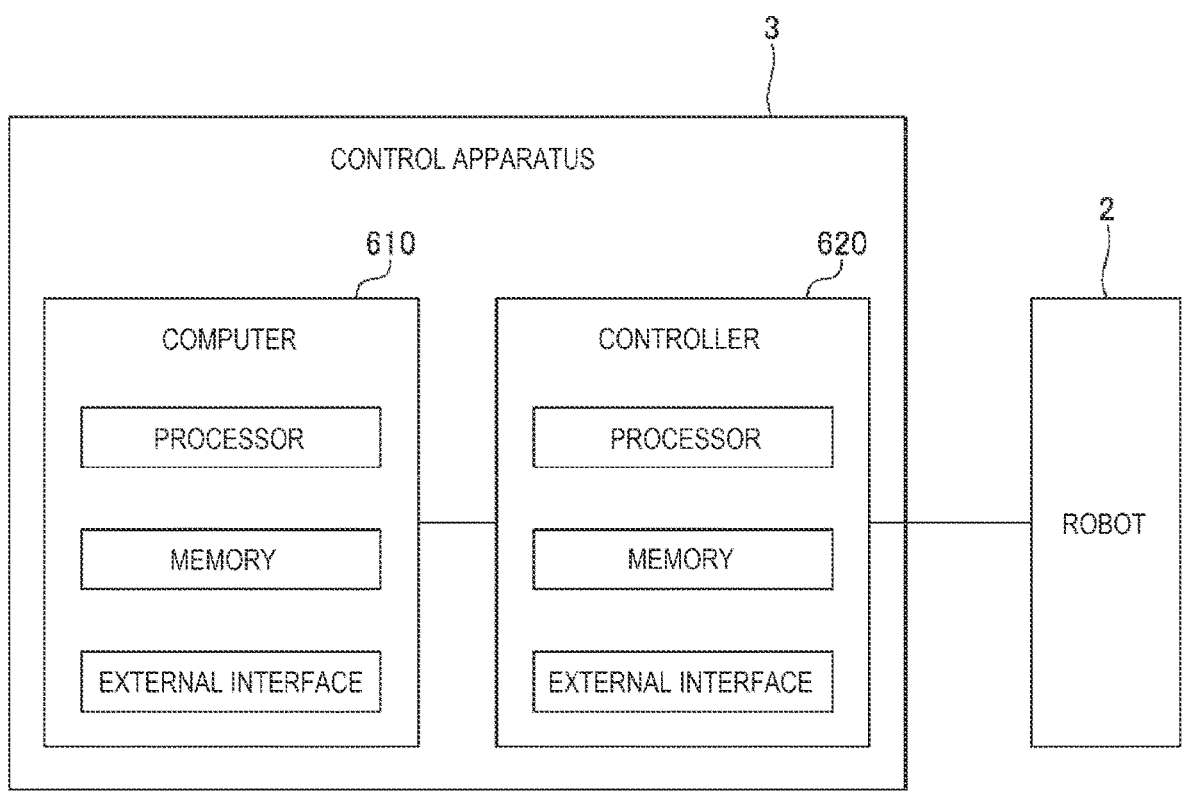
FIG. 3 is a block diagram showing an example of a hardware configuration of the robot system shown in FIGS. 1 and 2.

FIG. 1 is a perspective view showing the robot system according to the first embodiment. FIG. 2 is a functional block diagram of the robot system shown in FIG. 1. FIG. 3 is a block diagram showing an example of a hardware configuration of the robot system shown in FIGS. 1 and 2.

In the respective drawings of this application, an X-axis, a Y-axis, and a Z-axis are set as three axes orthogonal to one another. The X-axis and the Y-axis are parallel to a horizontal plane and the Z-axis is a vertical axis. Further, in the respective drawings, these axes are shown by arrows and the head sides of the arrows are "plus" and the tail sides are "minus" in the following explanation. Furthermore, the plus side of the Z-axis is also referred to "upper" and the minus side of the Z-axis is also referred to "lower".

A robot system 1 shown in FIG. 1 is a system including the so-called six-axis vertical articulated robot. As shown in FIG. 1, the robot system 1 includes a robot 2 and a control apparatus 3.

1.1. Robot

The robot 2 shown in FIG. 1 includes a base 110 and a robot arm 10 coupled to the base 110.

The base 110 is fixed to a placement part 9 on e.g. a floor, a movable platform, or the like. In FIG. 1, an XY-plane is the placement part 9.

The robot arm 10 has an arm 11 pivotably coupled to the base 110, an arm 12 pivotably coupled to the arm 11, an arm 13 pivotably coupled to the arm 12, an arm 14 pivotably coupled to the arm 13, an arm 15 pivotably coupled to the arm 14, and an arm 16 pivotably coupled to the arm 15. Of the base 110 and the arms 11 to 16, portions that bend or pivot the two members coupled to each other respectively form "joint portions". The base 110 side of the robot arm 10 is referred to as "proximal end side" and an opposite side to the proximal end of the robot arm 10 is referred to as "distal end side".

Note that the number of arms of the robot arm 10 may be one to five, seven, or more. Or, the robot 2 may be a scalar robot or a dual-arm robot including two or more robot arms 10.

As shown in FIG. 2, the robot 2 has drive units 130 that drive the respective joint portions of the robot arm 10 and angle sensors 131 that detect rotation angles of the respective joint portions of the robot arm 10. The respective drive units 130 and the respective angle sensors 131 are respectively communicably connected to the control apparatus 3.

The drive unit 130 includes e.g. a motor and a reducer. The motor includes e.g. an AC servo motor and a DC servo motor. The reducer includes e.g. a planet gear reducer and a wave gearing.

The angle sensor 131 includes e.g. a magnetic or optical rotary encoder.

A hand 17 is attached to the distal end surface of the arm 16.

The hand 17 shown in FIG. 1 is a chuck-type end effector having a pair of finger portions and an object 8 is nipped and gripped with the fingers. That is, the hand 17 may be referred to as "gripping unit". According to the robot system 1 including the hand 17, e.g., work of feeding, removal, transfer, conveyance, assembly, etc. of the object 8 may be performed.

The robot 2 includes a force sensor 21 provided between the robot arm 10 and the hand 17. The force sensor includes e.g. a six-axis force sensor and a three-axis force sensor. The force sensor 21 is provided, and thereby, directions and magnitude of forces acting on the hand 17 and the robot arm 10 may be accurately detected. The force sensor 21 is communicably connected to the control apparatus 3. Note that the position in which the force sensor 21 is provided is not limited to this position, but may be between the two arms coupled to each other of the arms 11 to 16 or between the arm 11 and the base 110.

The robot 2 may include any other members, devices, etc. in addition to those described above. The other members include e.g. an imaging unit that images the object 8, the robot 2, or surroundings thereof, a pressure sensor that detects an external force applied to the robot 2, and a proximity sensor that detects an object approaching the robot 2 or the like.

1.2. Control Apparatus

The control apparatus 3 shown in FIG. 2 has a control unit 31, a memory unit 32, and an external input and output unit 33. The control apparatus 3 has a function of controlling driving of the robot arm 10 by outputting drive signals to the drive units 130 based on detection results by the force sensor 21 and the angle sensors 131.

The control unit 31 executes various programs etc. stored in the memory unit 32. Thereby, the control unit 31 may perform control of the operation of the robot 2, various calculations, various determinations, etc. Specifically, the control unit 31 has a function of controlling driving of the robot arm 10 based on output of the force sensor 21. Thereby, the control unit 31 may control the robot arm 10 to perform e.g. work of gripping and lifting the object 8 placed in the placement part 9 with the hand 17 and pressing the object 8 gripped by the hand 17 against the placement part 9.

In the memory unit 32, various programs that can be executed by the control unit 31 are saved. Further, in the memory unit 32, various data received by the external input and output unit 33 are saved.

The external input and output unit 33 is used for coupling between any devices provided outside and the control apparatus 3 in addition to the coupling between the control apparatus 3 and the robot 2.

The hardware configuration of the control apparatus 3 is not particularly limited, but includes e.g. a controller 610 communicably connected to the robot 2 and a computer 620 communicably connected to the controller 610 as shown in FIG. 3.

A processor shown in FIG. 3 includes e.g. a CPU (Central Processing Unit), an FPGA (Field-Programmable Gate Array), and an ASIC (Application Specific Integrated Circuit).

A memory shown in FIG. 3 includes e.g. a volatile memory such as a RAM (Random Access Memory) and a non-volatile memory such as a ROM (Read Only Memory). Note that the memory is not limited to an undetachable type, but may be a detachable external memory device.

An external interface shown in FIG. 3 includes various communication techniques. The communication techniques include e.g. USB (Universal Serial Bus), RS-232C, wired LAN (Local Area Network), and wireless LAN.

The hardware configuration of the control apparatus 3 is not limited to the configuration shown in FIG. 3. Further, another configuration may be added to the above described configuration of the control apparatus 3. Furthermore, various programs, data, etc. saved in the memory unit 32 are stored in the memory unit 32 in advance, however, may be stored in a recording medium such as a CD-ROM and provided from the recording medium or provided via a network or the like.

Next, the control unit 31 is described in detail. The control unit 31 shown in FIG. 2 has a target force setting part 311, a pressing force acquisition part 312, a comparison part 313, a driving instruction part 314, a determination part 315, and an upper limit setting part 316 as functional parts.

The target force setting part 311 determines a target force when control to increase a pressing force close to the target force, i.e., force control is performed.

The pressing force acquisition part 312 acquires the pressing force when the object 8 gripped by the hand 17 is pressed against the placement part 9 based on a reaction force detected by the force sensor 21.

The comparison part 313 compares the pressing force acquired by the pressing force acquisition part 312 and the target force determined by the target force setting part 311 and outputs a comparison result.

The driving instruction part 314 outputs a signal for driving the robot arm 10 by the force control. Thereby, the robot arm 10 performs a pressing operation to press the object 8 gripped by the hand 17 against e.g. the placement part 9.

The determination part 315 determines whether or not to sequentially repeat a setting change operation to increase the target force determined by the target force setting part 311 to be larger than the previous target force, a pressing operation to press the object 8 against the placement part 9 by the force control, and a pressing force acquisition operation to acquire the pressing force based on the comparison result output from the comparison part 313.

The upper limit setting part 316 sets an upper limit of the target force in the force control. The above described driving instruction part 314 outputs the signal for driving the robot arm 10 by the force control to bring the pressing force close to the target force set within a range equal to or smaller than the upper limit set by the upper limit setting part 316.

1.3. Control Method of Robot System

Next, a control method of the robot system 1 will be explained.

The control method of the robot system 1 is processing by the control apparatus 3, for example, when work to fit the object 8 in a fitted object (not shown) is performed by gripping and pressing the object 8 with the hand 17 against the fitted object. Specifically, the control method of the robot system 1 includes a target force upper limit setting step S1 of setting the upper limit of the pressing force in the pressing operation, i.e., the upper limit of the target force and a working step S2 of performing work based on the set upper limit of the target force.

1.3.1. Target Force Upper Limit Setting Step S1

The target force upper limit setting step S1 includes a method of setting a target force upper limit according to an embodiment. At the target force upper limit setting step S1, as described above, when the work to fit the object 8 gripped by the hand 17 in the fitted object is performed, the upper limit of the pressing force to press the object 8 gripped by the hand 17 against the fitted object or the like is set. In other words, at the target force upper limit setting step S1, the upper limit of the pressing force that does not cause sliding between the hand 17 and the object 8 is searched for by actual measurement of the pressing force while changing the target force. A state in which sliding is caused between the hand 17 and the object 8 refers to a state in which a relative position or posture of the hand 17 and the object 8 changes.

Figure 4:
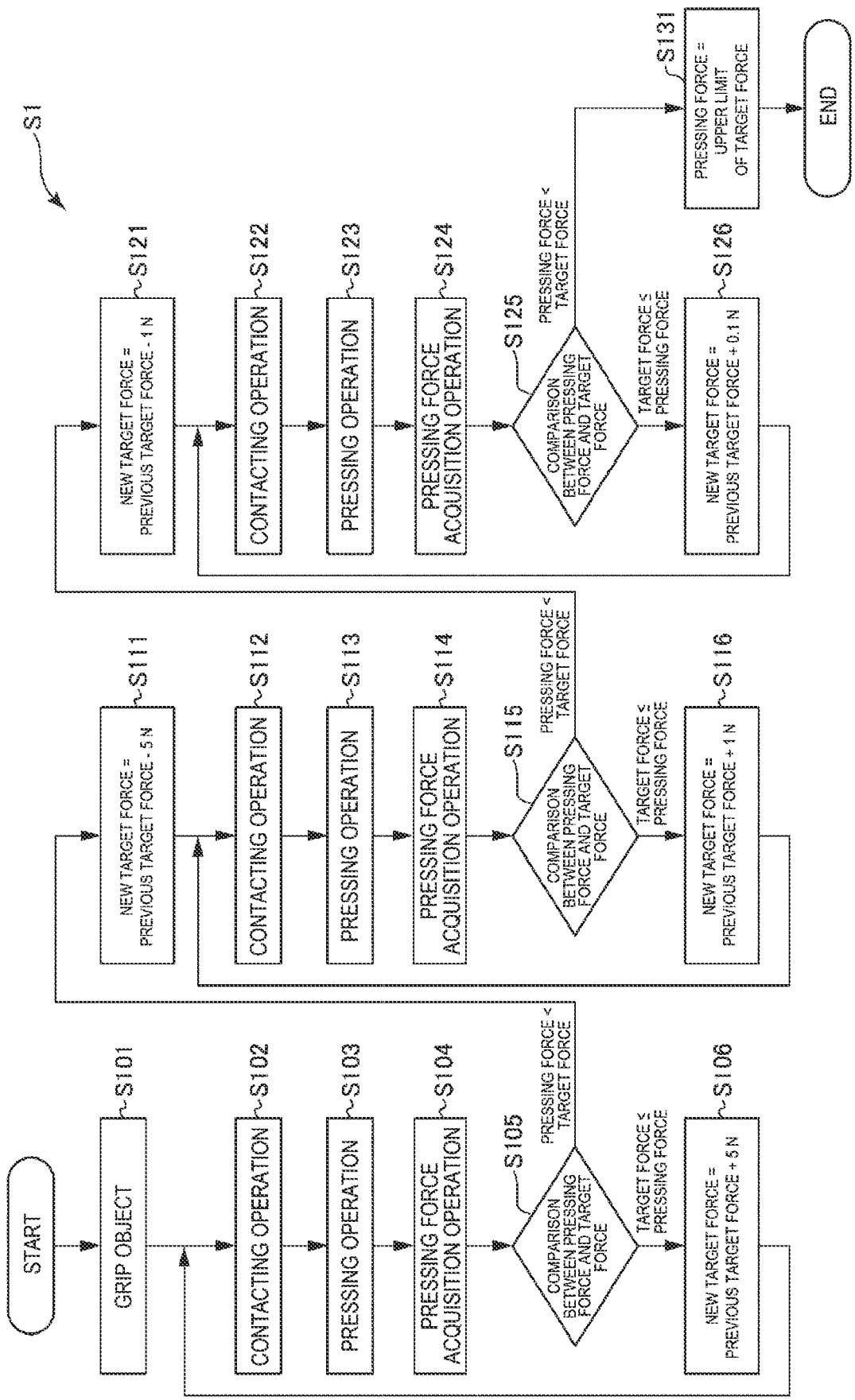
FIG. 4 is a flowchart showing a method of setting a target force upper limit according to the embodiment.

FIG. 4 is a flowchart showing the method of setting the target force upper limit according to the embodiment. As below, the processing by the control apparatus 3 according to the target force upper limit setting step will be explained with reference to FIG. 4.

First, as step S101, the control apparatus 3 controls driving of the robot arm 10 and the hand 17 and controls the hand 17 to grip the object 8. Thereby, the object 8 can be lifted and transferred.

Then, as step S102, a contacting operation to move the position of the hand 17 gripping the object 8 by the robot arm 10 and bring the object 8 into contact with the placement part 9 is performed. Detection of the contact state by the control apparatus 3 may be performed based on the detection results of the angle sensors 131 or performed based on the detection result of the force sensor 21.

Then, as step S103, the control apparatus 3 performs the pressing operation to press the object 8 gripped by the hand 17 against the placement part 9. The pressing operation is to press the object 8 against the placement part 9 by driving the robot arm 10 based on the force control to bring the pressing force acquired by the pressing force acquisition part 312 close to the target force. Here, as an example, the target force is set to 5 N.

The surface against which the object 8 is pressed in the pressing operation (contact surface) may be any surface, not limited to the placement part 9. In consideration of the details of work at the working step S2, which will be described later, the material or the like of the placement part 9 may be appropriately selected. For example, as described above, when the work to fit the object 8 in the fitted object is performed, in the pressing operation, it is preferable to press the object 8 against a surface formed using the same material as the constituent material of the fitted object. Thereby, finally, the upper limit suitable for the work to fit the object 8 in the fitted object may be accurately obtained.

By the contacting operation before the pressing operation, an effect of relaxation of an impact at the contact is obtained. Specifically, in the contacting operation, the object 8 is brought into contact with the placement part 9, and then, the pressing operation is performed. That is, the contacting operation may be performed with priority on slow contact of the object 8 with the placement part 9 by e.g. position control, and then, the goal may be changed and the pressing operation by the force control may be performed. Thereby, compared to a case without the contacting operation, the impact at the contact may be relaxed.

Then, as step S104, the control apparatus 3 performs the pressing force acquisition operation to acquire the force acting on the hand 17 during the pressing operation as the pressing force. During the pressing operation, a reaction force acts on the force sensor 21 via the object 8 and the hand 17. The pressing force may be acquired by detection of the reaction force. In the force control, usually, the pressing force is acquired and the pressing force is brought closer to the target force by feedback control. Accordingly, usually, the pressing force equal to the target force is acquired. However, when some environmental change occurs, for example, when sliding is caused between the hand 17 and the object 8 or when an instantaneous impact is caused between the object 8 and the placement part 9, the pressing force may be smaller or larger than the target force. Of the phenomena, sliding between the hand 17 and the object 8 depends on a friction force between the hand 17 and the object 8 or the like and sliding does not occur in principle unless the pressing force exceeds the friction force. Accordingly, at the target force upper limit setting step S1, the pressing force is acquired while the target force is changed and the maximum target force that does not cause sliding may be searched for. Then, the searched maximum target force is set as the upper limit of the target force at the working step S2 to be described later.

At step S105, the control apparatus 3 determines whether or not an increase of the target force is necessary. The determination part 315 determines whether or not repetition of the setting change operation to increase the target force, the contacting operation, the pressing operation, the pressing force acquisition operation is necessary based on the comparison result output from the comparison part 313. Specifically, as a result of the comparison between the pressing force and the target force, when target force pressing force, that is, when the pressing force may be set to be equal to or larger than the target force as a result of the force control to bring the pressing force close to the target force, the process moves to step S106, which will be described later. On the other hand, when pressing force<target force, that is, when the pressing force does not reach the target force even by the force control to bring the pressing force close to the target force, the process moves to step S111, which will be described later.

At step S106, the control apparatus 3 sets a new target force to a value larger by 5 N than the previous target force. Therefore, here, the new target force is 10 N. Then, the process returns to step S102. Note that an amount of increase of the target force at step S106 is not limited to 5 N, but may be another value. For example, in consideration of the mechanical strength of the typical object 8, the friction force between the object 8 and the hand 17, or the like, it is preferable that the amount of increase of the target force is set to be substantially from 1 N to 20 N.

At step S102 at the second time, first, the robot arm 10 is driven to separate the object 8 from the placement part 9, and then, the robot arm 10 is driven again to bring the object 8 into contact with the placement part 9.

At step S103 at the second time, the pressing operation to press the object 8 against the placement part 9 is performed based on the force control using the new target force set at step S106.

At step S104 at the second time, the pressing force based on the new target force is acquired.

At step S105 at the second time, whether or not another increase of the target force is necessary is determined. Then, when pressing force<target force, the process moves to step S111 to be described later. On the other hand, when target force 5 pressing force, step S106 and steps S102 to S105 are repeated until the state of pressing force<target force appears, in other words, until a state in which the pressing force is not equal to or larger than the target force appears.

The state in which the pressing force is not equal to or larger than the target force refers to a state in which sliding occurs between the hand 17 and the object 8 even when an attempt to increase the pressing force by the force control is made. When the sliding occurs, the pressing force does not reach the target force and, consequently, the state of pressing force<target force appears. When the state appears, the process moves to step S111 to be described later.

Figure 5:
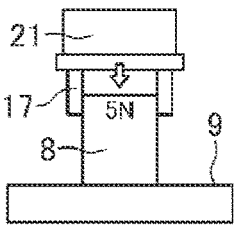
FIG. 5 is a table for explanation of changes of a pressing force when a target force is increased by 5 N within predetermined times.
Figure 5:
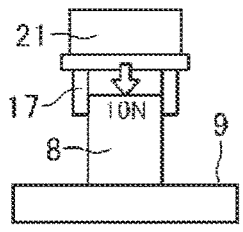
Figure 5:
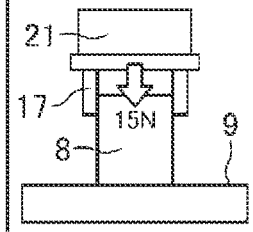
Figure 5:
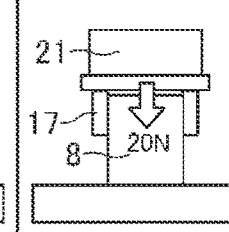
Figure 6:
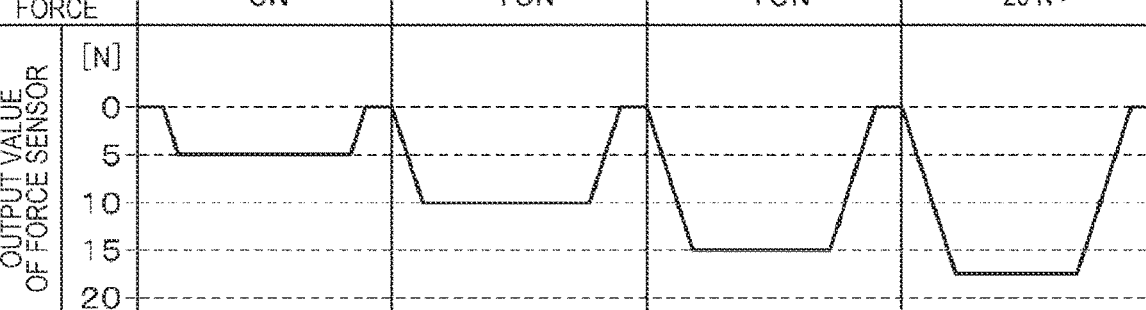
FIG. 6 is a graph showing transitions of a force detected by a force sensor within the predetermined times shown in FIG. 5.
Figure 6:
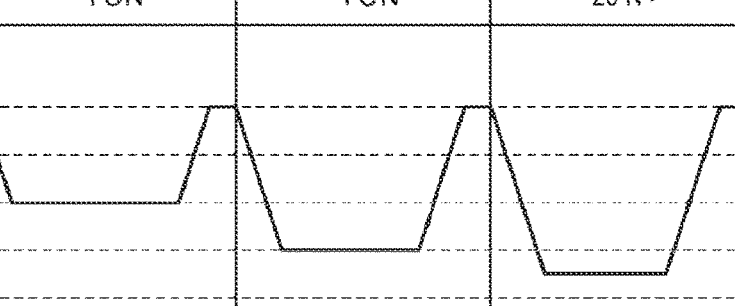
Figure 6:
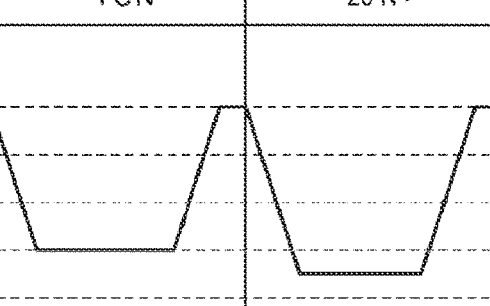
Figure 6:
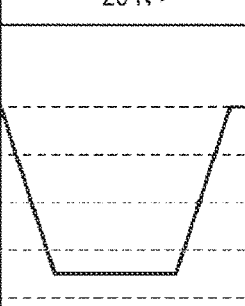

Examples of relationships between the target force and the pressing force at the above described steps S103 to S106 are shown in FIGS. 5 and 6. FIG. 5 is a table for explanation of changes of the pressing force when the target force is increased by 5 N within predetermined times. FIG. 6 is a graph showing transitions of the force detected by the force sensor 21 within the predetermined times shown in FIG. 5.

In the example shown in FIG. 5, the target force in 0 to 5 seconds from the start of the target force upper limit setting step S1 is set to 5 N. In this regard, the pressing force is also 5 N, and it may be estimated that sliding does not occur between the hand 17 and the object 8. In an elapsed time from 5 to 10 seconds, the target force is set to 10 N and the target force is set to 15 N from 10 to 15 seconds. During the times, the pressing force is equal to the target force and it may be estimated that sliding does not occur between the hand 17 and the object 8. On the other hand, in the example shown in FIG. 5, when the target force is set to 20 N in an elapsed time from 15 to 20 seconds, the pressing force is smaller than 20 N. That is, the state of pressing force<target force appears and occurrence of sliding may be determined.

In FIG. 6, for 20 seconds shown in FIG. 5, the transitions of the force detected by the force sensor 21 are shown. As shown in FIG. 6, when the target force is increased from 5 N→10 N→15 N→20 N, a state in which a larger force is not detected at about 17 N. In this regard, it is estimated that sliding between the hand 17 and the object 8 occurs.

At step S111, with reference to the target force that the pressing force does not reach at the above described steps S102 to S106, a smaller value by 5 N is set as a new target force. That is, at step S111, the control apparatus 3 sets a value smaller by 5 N than the previous target force as the new target force. Therefore, here, the new target force is 15 N. Then, the process moves to step S112. Note that an amount of decrease of the target force at step S111 is not limited to 5 N, but may be another value. In view of returning to the value at which the pressing force is equal to larger than the target value, it is preferable that the amount of decrease may be set to a value equal to the amount of increase at step S106.

Steps S112 to S116 are the same as steps S102 to S106 except that the amount of increase of the target force is different.

That is, first, at step S112, the robot arm 10 is driven to separate the object 8 from the placement part 9, and then, the robot arm 10 is driven again to bring the object 8 into contact with the placement part 9.

At step S113, the pressing operation to press the object 8 against the placement part 9 is performed based on the force control using the new target force set at step S111.

At step S114, the pressing force based on the new target force is acquired.

At step S115, whether or not an increase of the target force is necessary is determined. Then, when pressing force<target force, the process moves to step S121, which will be described later. On the other hand, when target force pressing force, step S116 and steps S112 to S115 are repeated until the state of pressing force<target force appears, in other words, until the state in which the pressing force is not equal to or larger than the target force appears.

At step S116, the control apparatus 3 sets a value larger by 1 N than the previous target force as a new target force. Therefore, here, the new target force is 16 N. Then, the process returns to step S112. Note that the amount of increase of the target force at step S116 is not limited to 1 N, but may be another value smaller than the amount of increase of the target force at step S106. As an example, it is preferable that the amount of increase of the target force at step S116 is substantially from 5% to 50% of the amount of increase of the target force at step S106.

At step S112 at the second time, first, the robot arm 10 is driven to separate the object 8 from the placement part 9, and then, the robot arm 10 is driven again to bring the object 8 into contact with the placement part 9.

At step S113 at the second time, the pressing operation to press the object 8 against the placement part 9 is performed based on the force control using the new target force set at step S116.

At step S114 at the second time, the pressing force based on the new target force is acquired.

At step S115 at the second time, whether or not another increase of the target force is necessary is determined. Then, when pressing force<target force, the process moves to step S121 to be described later. On the other hand, when target force 5 pressing force, step S116 and steps S112 to S115 are repeated until the state of pressing force<target force appears, in other words, until the state in which the pressing force is not equal to or larger than the target force appears.

An example of a relationship between the target force and the pressing force at the above described steps S112 to S116 is shown in FIG. 7. FIG. 7 is a table for explanation of changes of the pressing force when the target force is increased by 1 N within predetermined times.

In the example shown in FIG. 7, the target force in 0 to 5 seconds from the start of the target force upper limit setting step S1 is set to 15 N, and the target force is set to 16 N in an elapsed time from 5 to 10 seconds. In this regard, the pressing force is also 16 N, and it may be estimated that sliding does not occur between the hand 17 and the object 8. On the other hand, in the example shown in FIG. 7, when the target force is set to 17 N in an elapsed time from 10 to 15 seconds, the pressing force is smaller than 17 N. That is, the state of pressing force<target force appears and occurrence of sliding may be determined.

At step S121, with reference to the target force that the pressing force does not reach at the above described steps S111 to S116, a value smaller by 1 N is set as a new target force. That is, at step S121, the control apparatus 3 sets a value smaller by 1 N than the previous target force as a new target force. Therefore, here, the new target force is 16.0 N. Then, the process moves to step S122. Note that an amount of decrease of the target force at step S121 is not limited to 1 N, but may be another value. In view of returning to the value at which the pressing force is equal to larger than the target value, it is preferable that the amount of decrease may be set to a value equal to the amount of increase at step S116.

Steps S122 to S126 are the same as steps S112 to S116 except that the amount of increase of the target force is different.

That is, first, at step S122, the robot arm 10 is driven to separate the object 8 from the placement part 9, and then, the robot arm 10 is driven again to bring the object 8 into contact with the placement part 9.

At step S123, the pressing operation to press the object 8 against the placement part 9 is performed based on the force control using the new target force set at step S121.

At step S124, the pressing force based on the new target force is acquired.

At step S125, whether or not an increase of the target force is necessary is determined. Specifically, when pressing force<target force, the process moves to step S131, which will be described later. On the other hand, when target force 5 pressing force, step S126 and steps S122 to S125 are repeated until the state of pressing force<target force appears, in other words, until the state in which the pressing force is not equal to or larger than the target force appears.

At step S126, the control apparatus 3 sets a value larger by 0.1 N than the previous target force as a new target force. Therefore, here, the new target force is 16.1 N. Then, the process returns to step S122. Note that the amount of increase of the target force at step S126 is not limited to 0.1 N, but may be another value smaller than the amount of increase of the target force at step S116. As an example, it is preferable that the amount of increase of the target force at step S126 is substantially from 5% to 50% of the amount of increase of the target force at step S116.

At step S122 at the second time, first, the robot arm 10 is driven to separate the object 8 from the placement part 9, and then, the robot arm 10 is driven again to bring the object 8 into contact with the placement part 9.

At step S123 at the second time, the pressing operation to press the object 8 against the placement part 9 is performed based on the force control using the new target force set at step S126.

At step S124 at the second time, the pressing force based on the new target force is acquired.

At step S125 at the second time, whether or not another increase of the target force is necessary is determined. Then, when pressing force<target force, the process moves to step S131 to be described later. On the other hand, when target force 5 pressing force, step S126 and steps S122 to S125 are repeated until the state of pressing force<target force appears, in other words, until the state in which the pressing force is not equal to or larger than the target force appears.

An example of a relationship between the target force and the pressing force at the above described steps S122 to S126 is shown in FIG. 8. FIG. 8 is a table for explanation of changes of the pressing force when the target force is increased by 0.1 N within predetermined times.

In the example shown in FIG. 8, the target force in 0 to 5 seconds from the start of the target force upper limit setting step S1 is set to 16.0 N, and the target force is set to 16.1 N in an elapsed time from 5 to 10 seconds and the target force is set to 16.2 N in an elapsed time from 10 to 15 seconds. In this regard, the pressing force is equal to the target force, and it may be estimated that sliding does not occur between the hand 17 and the object 8. On the other hand, in the example shown in FIG. 8, when the target force is set to 16.3 N in an elapsed time from 15 to 20 seconds, the pressing force is smaller than 16.3 N. That is, the state of pressing force<target force appears and occurrence of sliding may be determined.

At step S131, with reference to the target force that the pressing force does not reach at the above described steps S121 to S126, a value smaller than the target force is set as "target force upper limit". As the target force upper limit, at the working step S2 to be described later, the maximum value of the target force having a high probability that sliding is not caused between the hand 17 and the object 8 may be employed. In the example of FIG. 8, a value smaller than 16.3 N may be set as the target force upper limit. In this manner, the value to be set as the upper limit is experimentally searched for, and thereby, a parameter necessary for the force control may be easily and accurately obtained. As a result, at the working step S2 to be described later, working efficiency and working accuracy may be improved.

Further, in the embodiment, the target force upper limit is searched for while the amount of increase of the target force is changed to be gradually smaller at three levels from 5 N→1 N→0.1 N. In this manner, the upper limit is searched for while the amount of increase of the target force is changed twice, and thereby, the search accuracy of the upper limit may be improved. Note that the number of changes of the amount of increase is not limited to two, but may be one, three, or more.

Furthermore, in the embodiment, as described above, the target force upper limit is searched for while the repetition cycle of the setting change operation to increase the target force, the pressing operation, and the pressing force acquisition operation is repeated. In the example of FIG. 8, the amount of increase of the target force is set to 0.1 N, the series of operations including step S126 and steps S122 to S125 is repeated at three times, and then, the state of pressing force<target force appears at the time when the target force is set to 16.3 N. In this case, the pressing force at the time may be set to "target force upper limit", however, in view of obtainment of the upper limit that does not cause sliding with a higher probability, it is preferable that the pressing force at the previous time to this time is set as "target force upper limit". This will be described later in detail.

Note that the time intervals to change the target force may be shorter or longer than 5 seconds.

1.3.2. Working Step S2

At the working step S2, driving of the robot arm 10 is controlled by the force control in consideration of the upper limit set at the target force upper limit setting step S1.

Figure 9:
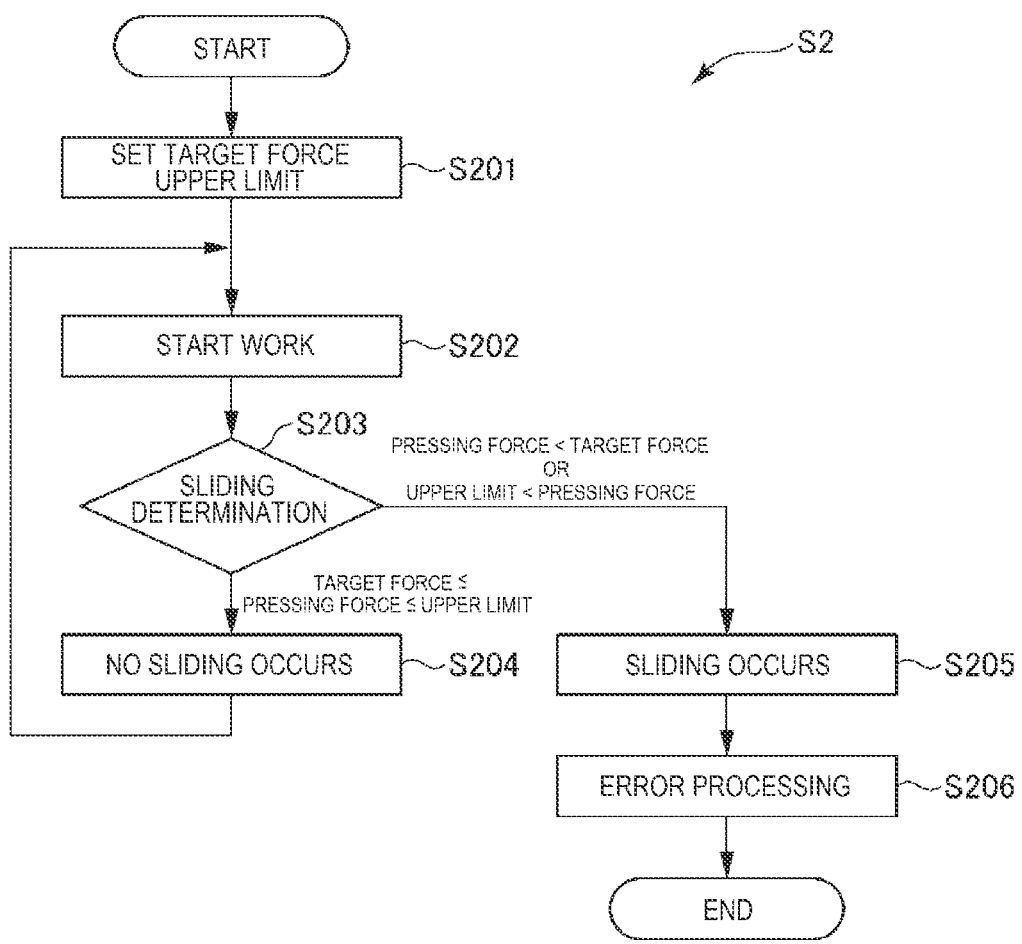
FIG. 9 is a flowchart showing a working step performed by gripping an object with a hand by force control in consideration of an upper limit set at a target force upper limit setting step shown in FIG. 4.

FIG. 9 is a flowchart showing the working step S2 performed by gripping the object with the hand 17 by force control in consideration of the upper limit set at the target force upper limit setting step S1 shown in FIG. 4.

First, at step S201, the upper limit set at the above described target force upper limit setting step S1 is set as the target force upper limit in the force control.

At the subsequent step S202, various kinds of work is started by the force control in consideration of the upper limit. After the work is started, the pressing force is monitored based on the force detected by the force sensor 21 as necessary. Then, a sliding determination at step S203 is performed as necessary.

In the sliding determination, the target force set in the force control and the monitored pressing force are compared. When the pressing force is equal to or larger than the target force and equal to or smaller than the upper limit, that is, when target force $\leq$ pressing force $\leq$ upper limit, the process moves to step S204. At step S204, a determination that sliding does not occur is made, and the flow is returned to step S202.

On the other hand, when the pressing force is smaller than the target force or the pressing force is larger than the upper limit, that is, when pressing force<target force or upper limit<pressing force, the process moves to step S205. At step S205, a determination that sliding occurs between the hand 17 and the object 8 is made. Specifically, when pressing force<target force, the pressing force is hard to be brought closer to the target force, and it may be estimated that sliding occurs. Or, when upper limit<pressing force, it may be estimated that an excessive pressing force is generated due to e.g. an instantaneous impact different from normal. In these cases, the process moves to step S206 and, the control unit 31 executes error processing of reporting an abnormality or stopping driving of the robot arm 10 as necessary. Thereby, the work may be stably performed.

As described above, the working step S2 is performed in consideration of the upper limit set at the target force upper limit setting step S1, and thereby, various kinds of work may be performed while occurrence of sliding between the hand 17 and the object 8 is suppressed. For example, when the work to fit the object 8 in the fitted object is performed, the fitting work may be performed without sliding. Accordingly, the probability of defective work may be reduced. As a result, defective fitting with sliding and lowering of working efficiency with redoing of the work may be suppressed.

Further, the upper limit is accurately searched for at the target force upper limit setting step S1, and the upper limit can be set to be higher immediately before sliding occurs. Thereby, the speed for transferring the object 8 can be increased and the working range of the fitting work can be expanded, and the working efficiency may be improved.

Furthermore, the upper limit is accurately obtained, and occurrence of sliding can be estimated based on the detection result by the force sensor 21. Thereby, the robot system 1 that can detect occurrence of sliding may be realized without provision of a new sensor or placement of an inspector.

As described above, the method of setting the target force upper limit according to the embodiment is the method of setting the target force upper limit in the robot 2 gripping the object 8 with the hand 17 as the gripping unit and operating under the force control to bring the force acting on the hand 17 close to the target force.

The method of setting the target force upper limit has the step of gripping the object 8 with the hand 17, the step of performing the pressing operation to press the object 8 gripped by the hand 17 against the placement part 9 as the contact surface, and the step of performing the pressing force acquisition operation to acquire the force acting on the hand during the pressing operation as the pressing force. Further, the method of setting the target force upper limit has the step of repeating the setting change operation to increase the target force, the pressing operation, and the pressing force acquisition operation until the state in which the pressing force is not equal to or larger than the target force appears, and the step of setting the target force upper limit in the force control based on the pressing force acquired in the pressing force acquisition operation at the time when the state appears.

According to the method of setting the target force upper limit, the target force upper limit in the force control may be easily and accurately set without using an expensive device. Thereby, when work is performed by the force control, the range of the target force in which sliding is not caused is easily specified and the target force may be substantially maximized. As a result, for example, the speed of the work by the force control may be easily increased and the work may be efficiently performed.

Note that the target force upper limit setting step S1 may be automatically or semi-automatically performed according to a program in the control apparatus 3. Accordingly, even a user inexperienced in handling of the robot system 1 may easily and accurately set the upper limit.

When the target force upper limit is set at step S131, as described above, the upper limit is set based on the pressing force at the time when the state of pressing force<target force appears. In this case, particularly, it is preferable to set the pressing force acquired in the pressing force acquisition operation at the previous time to the time when the state of pressing force<target force appears as the target force upper limit in the force control. At the previous time, non-appearance of the state of pressing force<target force is confirmed. Accordingly, the pressing force acquired at the previous time is used as the target force upper limit, and thereby, the upper limit having a particularly high probability that sliding is not caused can be set.

Note that, not the pressing force at the previous time, but the pressing force acquired at the two or more times previous thereto may be used.

The concept that the upper limit is set based on the pressing force acquired at the time when the state of pressing force<target force appears includes setting of the pressing force acquired at the previous time to the time when the state of pressing force<target force appears as the upper limit and setting of a value smaller than the pressing force acquired at the time when the state of pressing force<target force appears as the upper limit.

Further, in FIG. 6, after the acquisition of the pressing force, the operation to once separate the object 8 from placement part 9 is performed. This operation may be performed as necessary or omitted. For example, after the pressing force is acquired in the elapsed time from 0 to 5 seconds in FIG. 6, the target force may be increased to 10 N without separation of the object 8 from the placement part 9. In other words, at the above described step of repeating the setting change operation, the pressing operation, and the pressing force acquisition operation, the contacting operation to bring the object 8 with the placement part 9 is performed before the first pressing operation, i.e., step S103 at the first time, and then, the subsequent pressing operation to the first pressing operation may be performed without separation of the object 8 from the placement part 9.

In this manner, the separating operation is omitted, and thereby, consequently, all of the above described contacting operations, i.e., the steps S102, steps S112 and steps S122 at the second and subsequent times are omitted, and the impact when the object 8 is brought into contact with the placement part 9 may be avoided. That is, after the object 8 is once brought into contact with the placement part 9, the process is executed to step S131 without separation of the object 8 from the placement part 9, and thereby, occurrence of sliding between the object 8 and the hand 17 with an instantaneous impact may be prevented and the upper limit may be accurately searched for. As a result, lowering of the accuracy of the upper limit may be prevented.

FIG. 10 is a flowchart according to the method of setting the target force upper limit S1 of a modified example formed by omission of the second and subsequent contacting operations from the flowchart shown in FIG. 4.

In the flowchart shown in FIG. 10, compared to FIG. 4, all of the steps S102, steps S112, and steps S122 at the second and subsequent times are omitted.

Further, in the embodiment, as described above, the amount of increase of the target force is gradually set to be smaller from 5 N→1 N→0.1 N. Specifically, at steps S102 to S106 (first step), the setting change operation to increase the target force for 5 N (first amount of increase), the pressing operation, and the pressing force acquisition operation are performed. Further, at steps S112 to S116 (second step), the setting change operation to increase the target force for 1 N (second amount of increase), the pressing operation, and the pressing force acquisition operation are performed. Furthermore, at steps S122 to S126 (third step), the setting change operation to increase the target force for 0.1 N (third amount of increase), the pressing operation, and the pressing force acquisition operation are performed. That is, the step of repeating these setting change operation, pressing operation, and pressing force acquisition operation has a first step, a second step, and a third step at which the amounts of increase of the target force are different from one another, and the amounts of increase of the target force satisfy a relationship of first amount of increase<second amount of increase<third amount of increase.

Through at least the first step and the second step while the amount of increase of the target force is changed to be smaller, the upper limit may be searched for while the search range is made smaller, and the upper limit of the target force may be searched for more accurately.

The above described method of setting the target force upper limit is realized by the above described robot system 1. The robot system 1 has the robot arm 10, the hand 17 as the gripping unit, the force sensor 21, and the control unit 31. The hand 17 is provided in the robot arm 10 and grips the object 8. The force sensor 21 detects the force acting on the hand 17. The control unit 31 controls driving of the robot arm 10 by the force control to bring the force detected by the force sensor 21 close to the target force.

Further, the control unit 31 has the target force setting part 311, the pressing force acquisition part 312, the comparison part 313, the driving instruction part 314, the determination part 315, and the upper limit setting part 316. The target force setting part 311 determines the target force for searching for the upper limit. The pressing force acquisition part 312 acquires the force detected by the force sensor 21 when the object 8 is pressed against the placement part 9 as the contact surface as the pressing force. The comparison part 313 compares the target force and the pressing force and outputs the comparison result. The driving instruction part 314 outputs the signal for driving the robot arm 10. The determination part 315 determines whether or not to sequentially repeat the setting change operation to increase the target force, the pressing operation to press the object 8 against the placement part 9 by the force control, and the pressing force acquisition operation to acquire the pressing force until the state in which the pressing force is not equal to or larger than the target force appears. The upper limit setting part 316 sets the upper limit of the target force in the force control based on the pressing force when the state in which the pressing force is not equal to or larger than the target force appears.

Furthermore, the control unit 31 controls driving of the robot arm 10 by the force control in consideration of the upper limit set by the upper limit setting part 316.

According to the configuration, the robot system 1 that can easily and accurately set the upper limit of the target force in the force control may be realized. In the robot system 1, when work is performed by the force control, the range of the target force in which sliding is not caused is easily specified and the target force may be maximized. As a result, for example, the speed of the work by the force control may be easily increased and the work may be efficiently performed.

Further, for the setting of the upper limit, an expensive measuring device or the like is not necessary. Accordingly, the cost of the robot system 1 may be reduced.

Note that, as described above, the force sensor 21 shown in FIG. 1 is provided between the hand 17 and the robot arm 10. The force sensor 21 is provided in this position, and thereby, the force acting on the hand 17 may be accurately detected. Accordingly, the upper limit of the target force may be searched for more accurately. As described above, the position of the force sensor 21 is not limited to the position shown in FIG. 1, but may be another position.

As above, the method of setting the target force upper limit and the robot system according to the present disclosure are explained based on the illustrated embodiments, however, the present disclosure is not limited to these embodiments.

For example, in the robot system according to the present disclosure, the configurations of the respective parts of the above described embodiments may be replaced by arbitrary configurations having the same functions. Or, another arbitrary configuration may be added to the above described embodiments.

Further, in the method of setting the target force upper limit according to the present disclosure, a step for an arbitrary purpose may be added to the above described embodiments.

What is claimed is:

1. A method for causing a processor to execute a process, the method comprising executing on the processor the steps of:

first setting a target pressing force to a first target force value for obtaining a target force upper limit that is used as an upper limit force value for a robot when a hand of the robot gripping an object presses the object against a contact surface by applying the target pressing force with force control, the target pressing force being equal to or less than the upper limit force value;

gripping the object with the hand;

first performing a pressing operation to press the object gripped by the hand against the contact surface with the force control by applying the target pressing force having the first target force value;

first performing a pressing force acquisition operation to acquire a first actual pressed force value of a pressed force acting on the hand during the first performing of the pressing operation;

first comparing the first target force value with the first actual pressed force value to determine whether the first actual pressed force value of the pressed force is less than the first target force value of the target pressing force;

first repeating the first setting, the first performing of the pressing operation, the first performing of the pressing force acquisition operation, and the first comparing several times until the processor determines that the first actual pressed force value is less than the first target force value, wherein in the first setting, a previous one of the first target force values is increased by a first amount for each time of the first repeating to have a new one of the first target force values;

second setting the target pressing force to a second target force value when the processor determines that the first actual pressed force value is less than the first target force value, the second target force value is decreased from the first target force value by a second amount;

second performing the pressing operation with the force control by applying the target pressing force having the second target force value;

second performing the pressing force acquisition operation to acquire a second actual pressed force value of the pressed force acting on the hand during the second performing of the pressing operation;

second comparing the second target force value with the second actual pressed force value to determine whether the second actual pressed force value of the pressed force is less than the second target force value of the target pressing force;

second repeating the second setting, the second performing of the pressing operation, the second performing of the pressing force acquisition operation, and the second comparing several times until the processor determines that the second actual pressed force value is less than the second target force value, wherein in the second setting, a previous one of the second target force values is increased by a third amount for each time of the second repeating to have a new one of the second target force values, the third amount being less than the first amount; and setting one of the second actual pressed force values as the target force upper limit for an operation of the robot when the processor determines that the one of the second actual pressed force values of the pressed force is less than a corresponding one of the second target force values of the target pressing force.

2. The method of setting the target force upper limit according to claim 1, wherein the object gripped by the hand is in contact with the contact surface before a first time of the first performing of the pressing operation, and the first repeating and the second repeating are performed without separating the object from the contact surface.

3. A robot system comprising:

a robot, the robot having:
  a robot arm;
  a hand attached to the robot arm, the hand being configured to grip an object; and
  a force sensor configured to detect a force acting on the hand;

a memory configured to store a program; and a processor configured to execute the program so as to perform:
  first setting a target pressing force to a first target force value for obtaining a target force upper limit that is used as an upper limit force value for the robot when the hand gripping the object presses the object against a contact surface by applying the target pressing force with force control by using the force sensor, the target pressing force being equal to or less than the upper limit force value;
  first performing a pressing operation to press the object gripped by the hand against the contact surface with the force control by applying the target pressing force having the first target force value;
  first performing a pressing force acquisition operation to acquire a first actual pressed force value of a pressed force acting on the hand via the force sensor during the first performing of the pressing operation;
  first comparing the first target force value with the first actual pressed force value to determine whether the first actual pressed force value of the pressed force is less than the first target force value of the target pressing force;
  first repeating the first setting, the first performing of the pressing operation, the first performing of the pressing force acquisition operation, and the first comparing several times until the processor determines that the first actual pressed force value is less than the first target force value, wherein in the first setting, a previous one of the first target force values is increased by a first amount for each time of the first repeating to have a new one of the first target force values;
  second setting the target pressing force to a second target force value when the processor determines that the first actual pressed force value is less than the first target force value, the second target force value is decreased from the first target force value by a second amount;
  second performing the pressing operation with the force control by applying the target pressing force having the second target force value;
  second performing the pressing force acquisition operation to acquire a second actual pressed force value of the pressed force acting on the hand during the second performing of the pressing operation;
  second comparing the second target force value with the second actual pressed force value to determine whether the second actual pressed force value of the pressed force is less than the second target force value of the target pressing force;
  second repeating the second setting, the second performing of the pressing operation, the second performing of the pressing force acquisition operation, and the second comparing several times until the processor determines that the second actual pressed force value is less than the second target force value, wherein in the second setting, a previous one of the second target force values is increased by a third amount for each time of the second repeating to have a new one of the second target force values, the third amount being less than the first amount;

setting one of the second actual pressed force values as the target force upper limit for an operation of the robot when the processor determines that the one of the second actual pressed force values of the pressed force is less than a corresponding one of the second target force values of the target pressing force; and driving the hand and the robot arm with the force control in consideration of the target force upper limit during the operation of the robot.

4. The robot system according to claim 3, wherein the force sensor is provided between the hand and the robot arm.

\* \* \* \* \*